Patented May 19, 1931

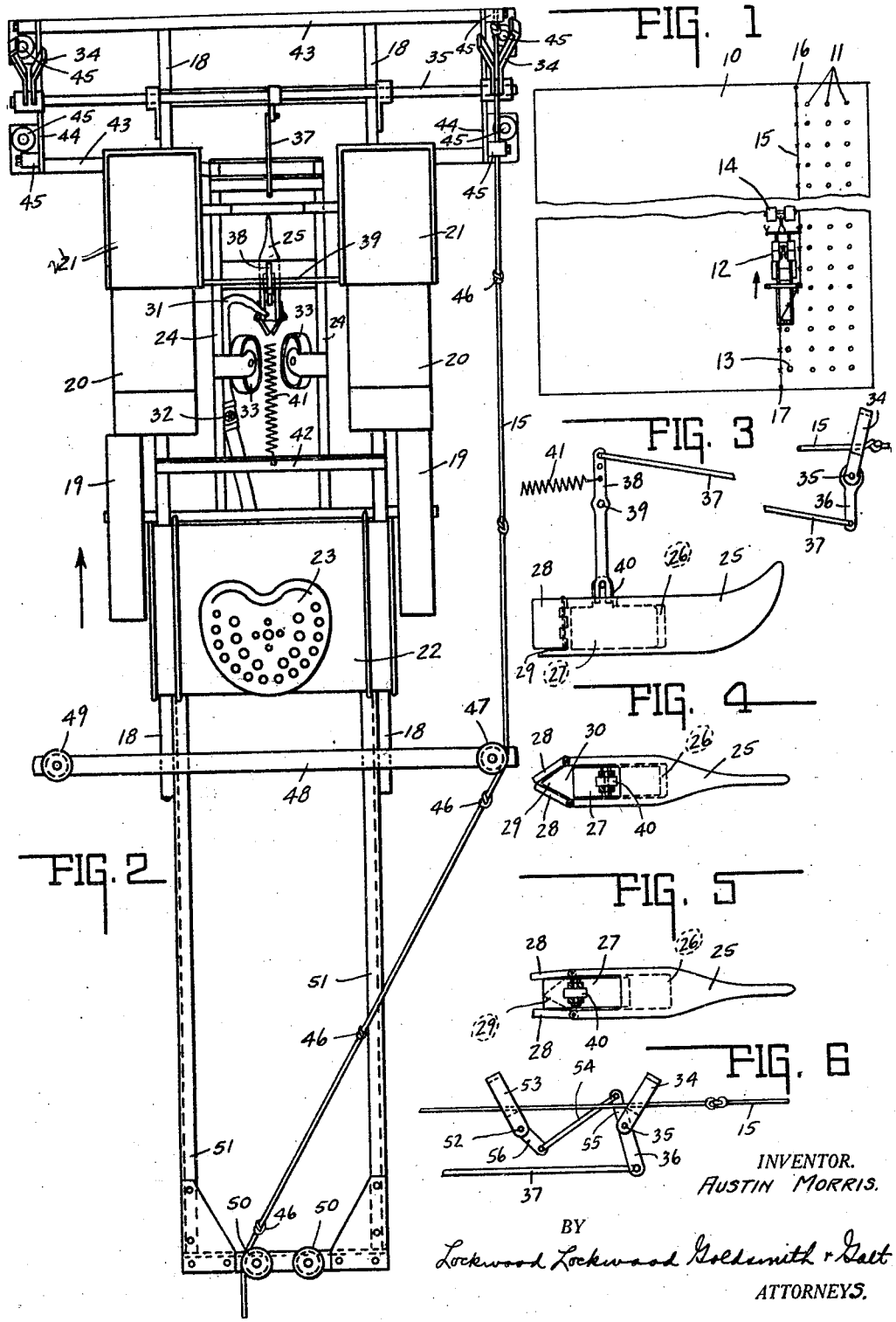

1,805,839

UNITED STATES PATENT OFFICE

AUSTIN MORRIS, OF GREENWOOD, INDIANA

PLANT-SETTING MACHINE

Application filed April 7, 1930. Serial No. 442,074.

This invention relates to a plant-setting machine principally for use in transplanting tomato and other similar plants.

The principal object of the invention is to provide apparatus by means of which a field of such plants may be set at a higher rate of speed and with greater accuracy in the placing of the plants than has been possible heretofore.

In the planting of such plants, it has been the practice heretofore to mark off the field to indicate the proper position for each of the plants. A planting machine is then driven backward and forward across the field. The said machine carries a device, usually termed a "shoe," which cuts a furrow into which a plant may be placed by hand. One or more men ordinarily ride the setting machine and place the plants in the said furrow at the points indicated by the marks previously placed upon the field. The speed of this process is limited to the speed at which the men can accurately place the plants at the proper position within the furrow.

One feature of the present invention resides in the provision of means whereby the plants are placed by the men in a receptacle associated with said shoe and are automatically discharged therefrom at the proper time to assume their proper position upon the field. The discharge of the plants from the said receptacle is accomplished by means of mechanism actuated by a so-called "check wire" stretched from end to end of the field and carrying knots or other projections properly spaced to actuate the said mechanism to discharge the plants at their proper place.

Another important feature of the invention resides in the provision of mechanism for moving the said check wire from one side of the row of plants to the opposite side without damaging the plants. This is accomplished by an attachment upon the setting machine which picks up the said check wire upon one side of the row of plants and automatically lays it down upon the opposite side in the proper position for the setting of the next row of plants. By means of this feature, all damage to plants by contact with the check wire is eliminated and a great saving in time is effected in placing the check wire in position for setting each row.

Other objects and features of the invention will be understood from the accompanying drawings and the following description and claims:

Fig. 1 is a plan view of a field illustrating the position of the check wire, several rows of plants already planted and the position of the plant-setting machine while planting another row. Fig. 2 is a plan view of the setting machine itself. Fig. 3 is a diagrammatic view in elevation of the linkage used to operate the plant-discharging mechanism and its relation to the shoe before mentioned. Figs. 4 and 5 are plan views of the said shoe, plant-receiving receptacle and discharge mechanism shown in the plant-receiving and plant-discharging position respectively. Fig. 6 is a diagrammatical elevational view of an alternative form of the apparatus used to actuate the plant discharge mechanism.

In Fig. 1 is represented a field 10 having three rows 11 of plants already set thereon. A setting machine indicated generally by the numeral 12 is illustrated in the proper position for setting the fourth row 13 of the plants. The said machine is assumed to be progressing in the direction shown by the arrow and is drawn by a tractor, the rear end of which is indicated by the numeral 14. If desired, the setting machine may be horse drawn instead. A check wire 15 is attached to a suitable anchorage 16 at the end of the field toward which the machine is progressing. The said wire extends parallel with the rows of plants and is initially positioned between the last row planted and the desired position of the next row. The said check wire engages suitable mechanism, which will be hereinafter described, upon the setting machine and leaves the said setting machine, as indicated, at a point beyond the newly set row of plants. The end of the check wire at the end of the field from which the setting machine is projecting is fastened to a suitable anchorage 17 which bears the same relation to the fourth row of plants that the anchorage 16 bears to the third row. In the setting of the next succeeding row of plants, the direction of travel of the machine is reversed.

The setting machine itself comprises a frame having main longitudinal frame members 18 supported upon a pair of wheels 19 and carrying at the forward end attachments not shown in the drawings for attaching the machine to a tractor. Supported upon the frame members 18 are a pair of seats 20 for the operators and a pair of supports 21 for boxes of plants to be transplanted. A water tank 22 is likewise carried thereon and, above the water tank is a driver's seat 23 for use by the driver in case the apparatus is to be drawn by a horse or horses. A secondary frame 24 is carried by the frame 18 and in turn supports the shoe 25 for cutting the desired furrow in which the plants are to be placed. The frame 24 may be raised and lowered to regulate the depth of the furrow to be cut and also to raise the shoe above the ground.

The shoe 25 is formed with a central cavity 26 in which is carried a reciprocable member 27. At the rear of the shoe 25 there are placed a pair of hinged gates 28 normally maintained in the closed position shown in Fig. 4 by suitable springs. The under part of the shoe 25 terminates at the rearward end in a triangular lip 29. As will be seen from Fig. 4, the gates 28, reciprocable member 27 and lip 29 form together a receptacle 30 open at the top in which a plant may be placed. When the reciprocating member 27 is rearwardly moved, as shown in Fig. 5, a plant so placed is immediately discharged into the furrow cut by the shoe 25. It will be noticed also that in the movement of the said reciprocable member, the corners thereof engage the gate 28 for opening the same so that there is no possibility of crushing the plant between the said member and the said gates.

A water conduit 31 controlled by a valve 32 leads from the water tank 22 to a position directly above the receptacle 30. In practice, a small stream of water is continually discharged into the said receptacle and the joints between the lip 29 and the gates 28 are sufficiently water tight to permit a supply of water to accumulate in the said receptacle to be discharged with each plant. After the discharge of each plant, the furrow is closed to maintain the plant in position by means of a pair of rollers 33 carried upon the frame 24.

The mechanism for operating the reciprocable member 27 for discharging plants includes a pair of so-called "check forks" 34 carried by a horizontal shaft 35 supported upon suitable bearings on the frame members 18. The forks 34 are positioned at opposite sides of the machine and one is used to engage the check wire 15 when travelling across the field in one direction and the opposite one is so used when travelling in the opposite direction. The shaft 35 also carries a downwardly-extending lever 36 to which is connected a link 37 in turn connected to the upper end of a lever 38 pivotally mounted upon a shaft 39. The lower end of the lever 38 is forked and engages a lug 40 carried upon the upper surface of the reciprocable member 27. A tension spring 41 is connected to the lever 38 and to a cross member 42 forming a portion of the frame of the machine. The link 37 and spring 41 are shown partially cut away in Fig. 2 to show other parts in detail. A pair of transversely-extending frame members 43 are supported upon the frame members 18 and carry at each end a casting 44 supporting rollers 45 adapted to guide the check wire and maintain the same in proper engagement with the fork 34. The said check wire is provided with knots 46 at suitable intervals to determine the spacing of the plant setting.

In the operation of the apparatus so far described with the setting machine progressing in the direction of the arrow in Fig. 2, the check wire is guided by the rollers 45 and maintained in position in the crotch of one of the forks 34. As each of the knots 46 engages the said crotch, the fork 34 is pulled toward the rear end of the machine thus rocking the shaft 35 and actuating the link 37 and lever 38 to move the reciprocable member 27 to discharge a plant from the receptacle 30. As soon as the fork 34 has moved through a predetermined angle, the knot 46 is free to slip from the crotch thereof and the spring 41 operates to return the mechanism to its normal position. Immediately thereafter another plant may be placed in the receptacle 30 and may be discharged upon actuation of the mechanism by the next succeeding knot 46. It is only necessary, therefore, that the operators place the plants in the receptacle 30 between the time that the member 27 returns to normal position and the time of the next actuation of the discharge mechanism. The human element in maintaining the accuracy of planting is entirely eliminated. Since the human element is the limiting factor in the speed of the operation heretofore in use, the elimination of this factor makes it possible to greatly increase the speed of travel of the machine and at the same time maintain a much greater accuracy in the position of plant setting.

Upon leaving the rollers 45, the check wire 15 is trained about a pulley 47 carried upon a horizontal member 48 in turn carried upon the rear ends of frame members 18. A similar pulley 49 is provided at the opposite end of the member 48 for use in planting in the opposite direction. From the pulley 47, the check wire 15 is trained about a pulley 50 carried upon a frame 51 supported by the frame members 18. The said frame 51 is placed at a sufficient distance above the ground so that it does not interfere with the plants already set. The pulley 50 is offset from the center of the machine sufficiently to allow the check wire to be laid down on the ground to the left of the newly planted row of plants, referring to Figs. 1 and 2. By this means, all danger of damage to the plants is eliminated and the check wire is laid down in the proper position for the setting of the next row of plants.

At the completion of planting of the fourth row of plants, referring to Fig. 1, the machine is turned around, the anchorage 16 is moved to its proper place with relation to the next row to be planted and the process is repeated.

In Fig. 6 is illustrated an alternative form of apparatus for returning the reciprocable member 27 to plant-receiving position. In this alternative form, a horizontal shaft 52 is placed parallel with the shaft 35 and to the rear thereof. The shaft 52 carries at each end a check fork 53 similar to the check forks 34. The shafts 52 and 35 are connected by a link 54 and levers 55 and 56 in such manner that movement of one of said shafts in one direction moves the other in the opposite direction. The check wire 15 is successively passed through the crotches of forks 34 and 53. The engagement of the knots 46 with fork 34 actuates the reciprocable member 27 to discharge a plant, as previously described, and thereafter the engagement of the said knot with fork 53 actuates the mechanism to return the reciprocable member 27 to plant-receiving position. Thus a positive return for the member 27 is furnished and the spring 41 may be omitted.

The invention claimed is:

1. Plant-setting apparatus including a portable device adapted to be moved across a field, a receptacle carried thereby for the reception of a plant to be set, a hinged closure for said receptacle, and a reciprocable member automatically operable at predetermined intervals to engage said hinged closure for opening the same and to simultaneously discharge a plant from said receptacle.

2. Plant-setting apparatus including a portable device adapted to be moved across a field, a member carried thereby adapted to form a furrow for the reception of plants, said member including a receptacle for the reception of plants to be set, a hinged closure for said receptacle, and a reciprocable member automatically operable at predetermined intervals to engage said hinged closure for opening the same and to simultaneously discharge a plant from said receptacle into said furrow.

3. Plant-setting apparatus including a portable device adapted to be moved across a field, a plant-setting receptacle carried thereby, a reciprocable member adapted to discharge a plant therefrom for setting, a knotted check wire adapted to be placed in a predetermined position upon said field, a check fork carried by said device and engaging said check wire, and connecting means between said check fork and said reciprocable member adapted to actuate said member to discharge a plant when said check fork is engaged by each of the knots carried by said check wire.

In witness whereof, I have hereunto affixed my signature.

AUSTIN MORRIS.